United States Patent
Boll

(10) Patent No.: US 7,113,228 B1
(45) Date of Patent: Sep. 26, 2006

(54) MODULAR CONTROL PANEL FOR VIDEO APPARATUS

(75) Inventor: Roman Boll, Reinheim (DE)

(73) Assignee: Thomson Licensing, Boulogne-Billancourt (FR)

( * ) Notice: Subject to any disclaimer, the term of this patent is extended or adjusted under 35 U.S.C. 154(b) by 582 days.

(21) Appl. No.: 09/610,719

(22) Filed: Jul. 6, 2000

(30) Foreign Application Priority Data

Jul. 7, 1999 (DE) .................................. 199 31 202

(51) Int. Cl.
*H04H 5/222* (2006.01)
(52) U.S. Cl. ....................... 348/722; 345/173; 715/700
(58) Field of Classification Search ................ 348/722, 348/705, 595, 578; 345/173, 170; 715/700, 715/702; H04N 5/222
See application file for complete search history.

(56) References Cited

U.S. PATENT DOCUMENTS

| | | | | |
|---|---|---|---|---|
| 4,698,664 A | * | 10/1987 | Nichols et al. | ............. 348/184 |
| 4,773,005 A | | 9/1988 | Sullivan | |
| 5,036,395 A | * | 7/1991 | Reimers | ..................... 348/722 |
| 5,311,302 A | * | 5/1994 | Berry et al. | ............. 348/14.03 |
| 5,625,350 A | | 4/1997 | Fukatsu et al. | |
| 5,838,905 A | * | 11/1998 | Leigh | ......................... 709/201 |
| 5,959,539 A | | 9/1999 | Adolph et al. | |
| 6,175,390 B1 | | 1/2001 | Kim et al. | |
| 6,362,857 B1 | * | 3/2002 | Jung et al. | .................. 348/722 |

FOREIGN PATENT DOCUMENTS

| | | |
|---|---|---|
| DE | 4016928 | 11/1991 |
| DE | 19757493 | 7/1998 |
| DE | 3716318 | 11/1998 |
| EP | 0780990 | 6/1997 |
| EP | 00202275 | 11/2002 |

\* cited by examiner

*Primary Examiner*—Michael H. Lee
(74) *Attorney, Agent, or Firm*—Joseph J. Laks; Robert B. Levy; Jorge Tony Villabon

(57) ABSTRACT

The invention relates to a control panel for video apparatus. For realizing greater flexibility with such control panels there is proposed that the control panel comprises at least an operating module (31) and a control module (32), the control module (32) having a first interface (37) for connection to a control panel (2) and at least a second interface (35) for connection to the operating module (31), and the operating module (31) having at least an interface (34) for connection to the control module (32).

10 Claims, 3 Drawing Sheets

MODULAR CONTROL PANEL FOR VIDEO APPARATUS

BACKGROUND OF THE INVENTION

The invention relates to a control unit for video apparatus.

Operating panels for video apparatus generally comprise control elements by means of which for example switch operations can be triggered by a person using the control unit, display elements for instructing the user, and at least one interface to which apparatus to be controlled such as, for example, routers or mixing devices, can be connected. Depending on the selected interface between the video apparatus and the control unit, the control unit can be set up while it is not in the neighborhood of the apparatus to be controlled.

It is an object of the invention to provide a control unit that has a higher degree of flexibility compared to known control units for video apparatus.

SUMMARY OF THE INVENTION

This object is achieved in that the control unit comprises at least a control module and an operating module, the control module having a first interface for connection to a control panel and at least a second interface for connection of the operating module, and the operating module having at least an interface for connection to the control module.

By dividing the control unit into at least two modular sub-assemblies which can communicate with each other via an interface, the dimensions of the housings of the respective modules can be adapted to the elements contained in each respective module. In this manner the operating module can be made very flat and with little depth, so that it can also be built-in in a housing having little build-in depth. The control module which evaluates the actuation of operating elements and drives display elements, can be built-in at a location at which the build-in depth is unimportant because the interface is at a distance from the operating module.

In an advantageous embodiment as claimed in claim 2, control module and operating module can also have a direct connection i.e. without a cable therebetween. Preferably, the control module and the operating module have fastening possibilities such as, for example, screws and corresponding thread, by means of which such an arrangement can be mechanically connected and be separated as well.

This arrangement is advantageous in that the control module and operating module in the applications that accordingly have a build-in depth such as, for example, a rack, can also be built-in as a mechanical unit. This makes handling easier, for example, when exchanging or adding further modules.

In the arrangement of the operating module as claimed in claim 3, only few electronic components are necessary in the operating module, so that the cubic content is hardly increased as a result. On the other hand, the number of the necessary interface lines can be drastically reduced.

In an embodiment of the operating module as claimed in claim 4, always the same control module can be used despite the differently arranged operating modules (for example, different number of operating elements), because the function of the control module can accordingly be adapted thanks to the identification code of the control module.

An embodiment of the control module as claimed in claim 5 makes the construction possible of the operating module as claimed in claim 3.

BRIEF DESCRIPTION OF THE DRAWINGS

The invention will now be further described and elucidated with reference to the embodiment shown in the drawing, in which.

DETAILED DESCRIPTION OF THE PREFERRED EMBODIMENTS

Figure 1:
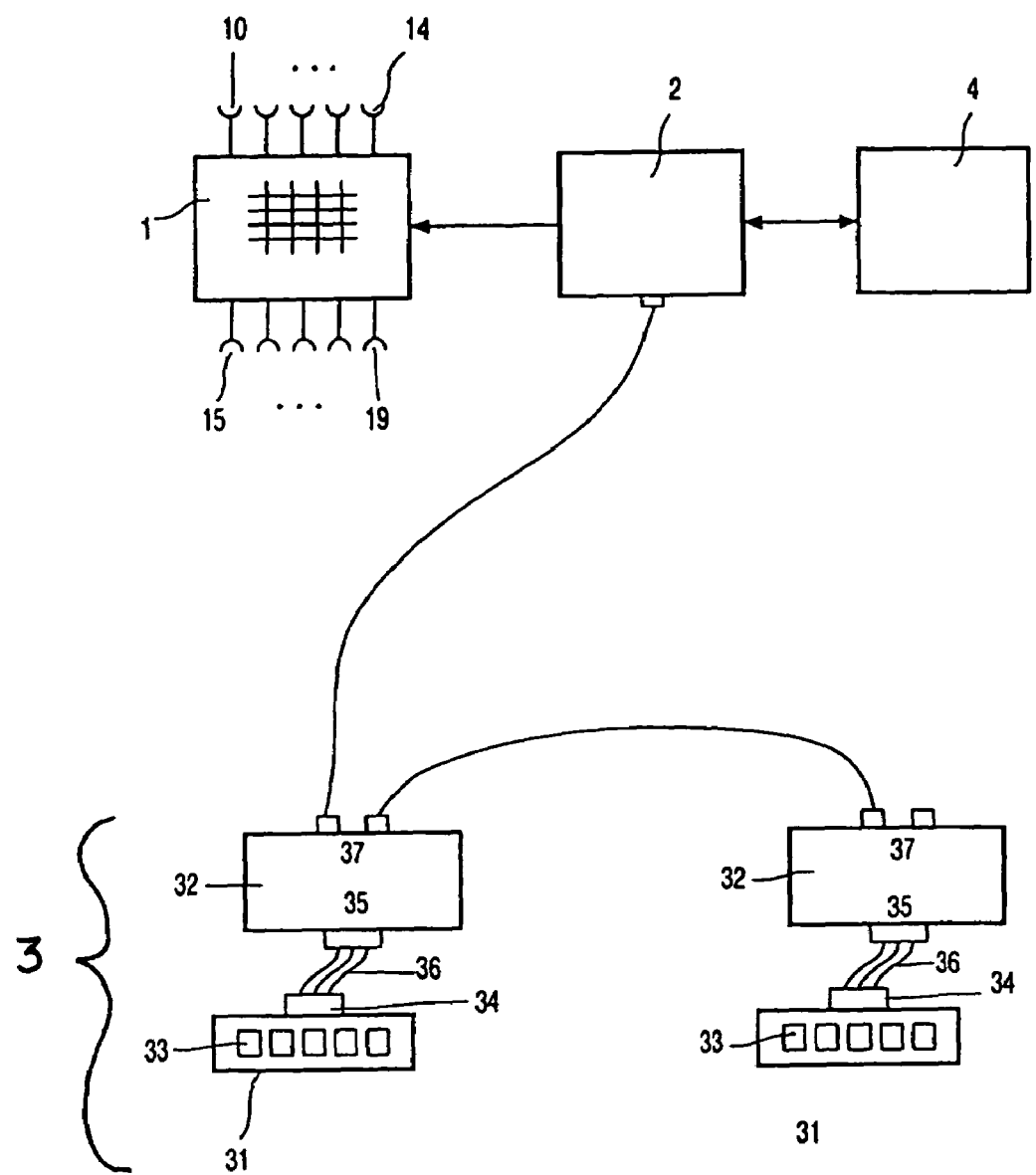
FIG. 1 shows the modular control panel according to the invention in combination with a signal router.

FIG. 1 shows the invention by the example of a so-called router. The router comprises a digital switching network 1 by means of which signal sources, which can be connected to inputs 10 . . . 14, can be optionally connected to signal sources that can be connected to outputs 15 . . . 19. The signals to be routed are both video signals and audio signals. A control panel 2, which receives respective switching instructions from a control unit 3, controls the digital switching network 1 in accordance with the switch instructions.

In the example embodiment, the control panel comprises a plurality of pairs of modules 3. In the simplest stage of construction the control unit may also comprise only a single pair of modules 3. Each pair of modules 3 is in the form of an operating module 31 and a control module 32. The operating module 31 has sixteen juxtaposed keys 33, with each key having a liquid crystal display (LC display) with 36 times 24 pixels. By means of the LC display, symbols, for example arrows for a menu drive and also alphanumerical signs, for example for denoting names for signal sources and signal drains, can be represented. With 36 times 24 pixels, preferably three-line displays of six alphanumeric signs each or two-line displays of four alphanumeric signs or a one-line display with two alphanumeric signs can be realized. In the case of the two-line display, for example, its first line may contain the name of a signal source and its second line the name of a signal drain. By means of light-emitting diodes of various colors the backlight of the LCD displays can be given in various colors. For example, by means of a green backlight there may be signaled that the signal source and signal drain respectively shown on the display, have not yet been interconnected. If, by pressing the respective key, the signal source and signal drain are connected, this connection is signaled by a red backlight.

By means of a seventeenth key, an operating menu can be invoked by means of which the function assigned to each key can be changed.

The operating module 31 contains commercially available pushbuttons with integrated LC display and integrated backlight as well as mechanical components and also an interface which will be referenced operating interface in the following to distinguish it from other interfaces. Since these commercially available pushbuttons with integrated LC display and integrated backlight have already integrated electronics for the driving (display and backlight are controlled via serial data words), the operating module could also be made completely without additional electronics. However, this could lead to the fact that the operating interface should then have a multiplicity of parallel terminals.

Figure 2:
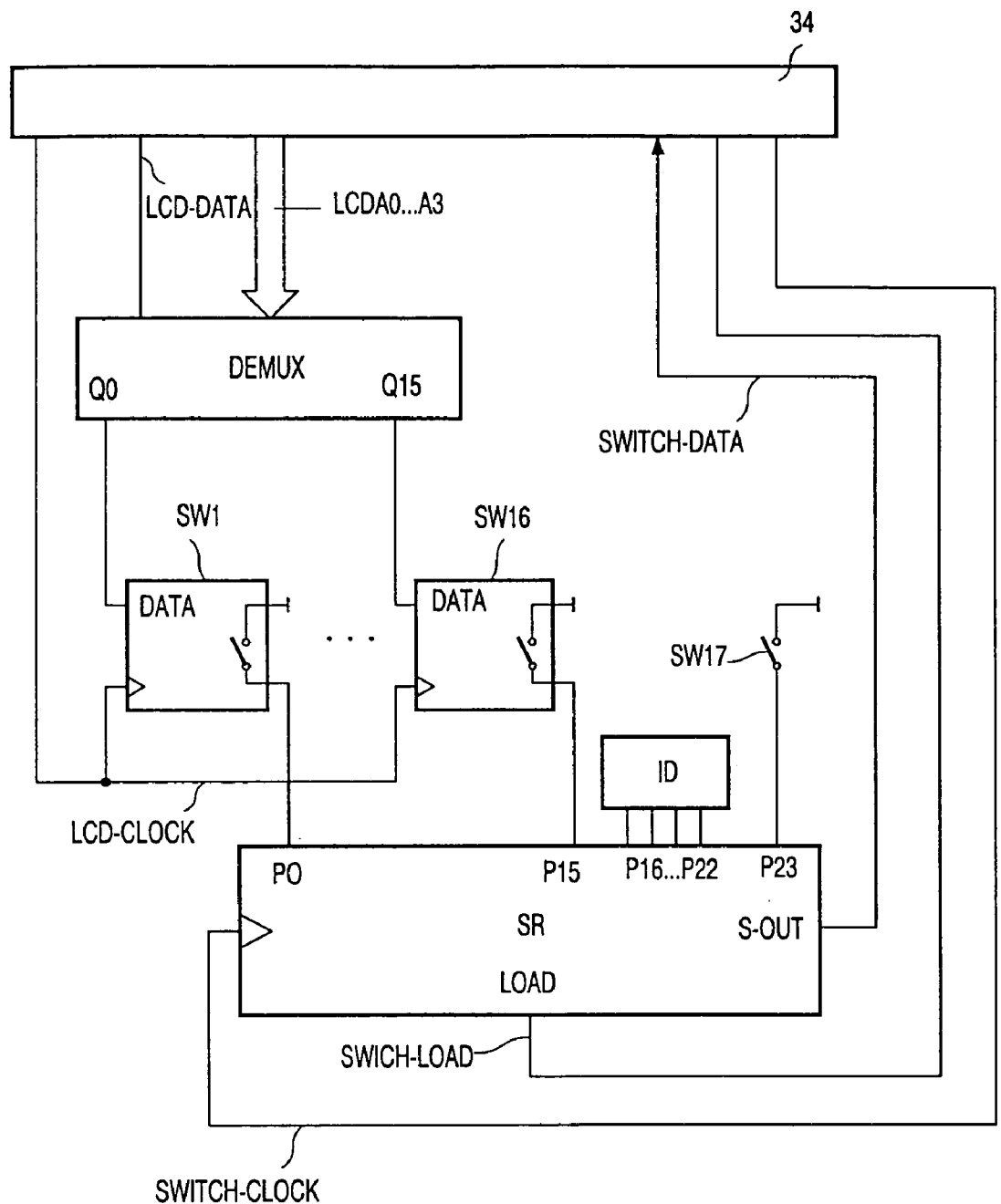
FIG. 2 shows a switching diagram of an operating module.
Figure 3:
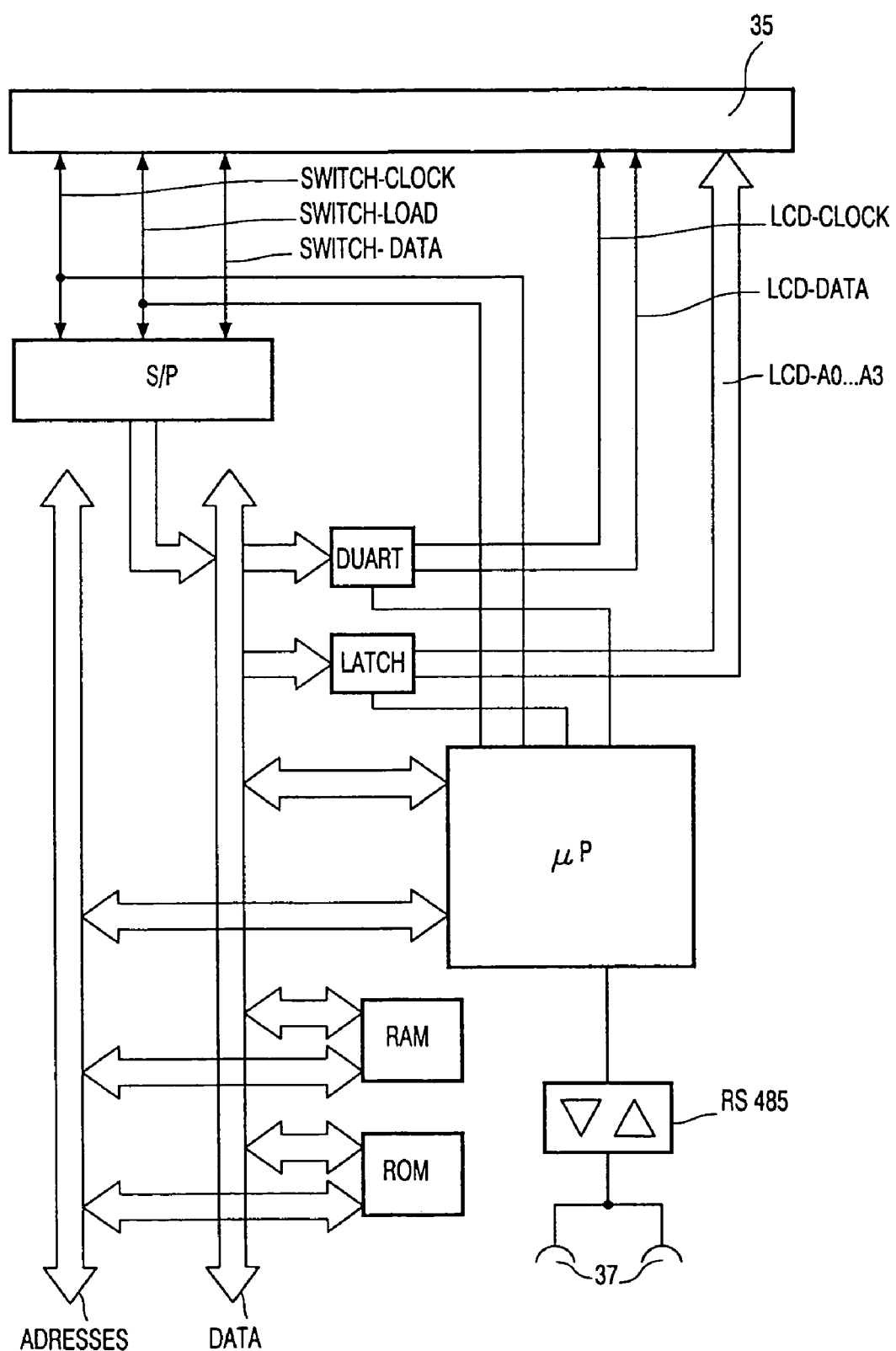
FIG. 3 shows a switching diagram of the control module.

FIG. 2 shows the compromise between component expenditure (required volume) and number of interface lines, which compromise is preferred in the example of embodiment. The state of the individual pushbuttons SW1 . . . SW16, of the pushbutton SW17 for invoking the operating menu, as well as a seven-bit wired code ID for identification of the operating module is combined to a serial data stream SWITCH_DATA by means of a shift register SR which has twenty-four inputs. In this manner, only three signal lines are necessary: a data line SWITCH_DATA, which is connected to the data output S_OUT of the shift register SR, a control line SWITCH_LOAD for loading the shift register SR, and a clock line SWITCH_CLOCK for serially reading out the shift register SR. The serial data streams for driving the LC displays are distributed to the individual data inputs DATA of the pushbuttons SW1 . . . SW16 by a demultiplexer DEMUX. Due to the sixteen LC-displays integrated with the pushbuttons, an address bus LCD_A0 . . . A3 with four lines is necessary for driving the demultiplexer DEMUX. The transfer of data from the outputs Q0 . . . Q15 of the demultiplexer DEMUX is controlled by a clock line LCD_CLOCK. In this manner only six signal lines are necessary for driving the pushbuttons SW1 . . . SW16. Additionally, there are power supply lines which are not shown. Demultiplexer DEMUX and shift register SR are shown as individual components for clarity. However, this does not form any restriction to the invention as regards such components. Actually, the demultiplexer is in the form of two identical demultiplexer modules and the shift register in the form of three identical individual shift registers. Since there has been ever more supply of commercially available components in the course of time, it is left to the expert to choose the respective appropriate components from the available components.

Since the operating module 31 as regards the electronic components is restricted to a demultiplexer DEMUX for driving the LC display elements and a shift register SR for combining the switching states of the pushbuttons, the dimensions of the operating module 31 are, in essence, predefined only by the operating and display elements.

In the operating module 31 the operating interface is arranged as a plug 34. The control module has an operating interface corresponding to this and arranged as a socket 35. In this manner, the operating module 31 and control module 32 can also be interconnected directly, that is to say, without the insertion of an electric line 36. By means of two screws the control module 32 can be detachably connected to press nuts provided in the housing of the operating module 31, to mount the pair of modules 3 as a mechanical unit in a frame. Preferably, the height of the control module 32 corresponds at most to the height of the operating module 31 to be able to accommodate a plurality of operating modules one under the other without spaces. When the operating module 31 is built-in in a flat housing, for example, a desktop housing, these screws may be removed and the operating module and control module can be interconnected by means of a cable 36 with the respective plug and socket. With the arrangement of the operating interface described in the Figure, operating module 31 and control module 32 can be built-in up to a meter apart. This is sufficient for the application under consideration. Naturally, also larger distances may be bridged by additional driver modules and so on.

The control module 32 comprises, in essence, a processor µP and volatile and non-volatile memories RAM, ROM for receiving variable data, for example, the names of the data sources and data wells to be shown and for receiving the instruction data. By means of a serial-to-parallel converter S/P, which may be realized, for example, by means of a shift register, the key states and the ID code of the operating module 31 is converted into three data words of eight bits and applied to the processor µP by the data bus DATA. From the data words containing the switching states of the pushbuttons SW1 . . . SW17, the processor µP generates corresponding control instructions which are transported to the control panel 2 via a further interface which will be referenced control panel interface 37 in the following.

By means of the identification code ID that has been read out, the processor can distinguish different structures of operating modules and inform the control panel 2 thereof. In this manner, the control panel 2 can detect how many operating modules there are and which operating modules a control panel actually consists of. This allows for easy expansion of a control unit by simply adding or removing new or other pairs of modules. For controlling a menu, less than sixteen keys are necessary. For this purpose an operating module having fewer keys can be installed, which also optically signals a different function. Based on the identification, the processor µP can therefore recognize which operating module is to be used as a dedicated menu keyboard. This is very user-friendly because in this way erroneous configurations by a user are avoided.

Information received from the control panel 2 via the control panel interface is converted into the multiplexed data stream described with reference to the operating module by the processor µP of the control module 32 to drive the LC displays. For this purpose, respective data for driving the LC displays are read from the data bus DATA and combined to the described serial data stream by means of a parallel-to-serial converter which is in the form of a buffer memory LATCH, DUART accordingly driven by the processor µP.

For the transmission of the data from the control module 32 to the control panel 2 and back, a proprietary protocol is used. The control panel interface 37 is arranged as an RS-485 interface, so that control panel and control unit can be set up 1200 meters apart. Preferably, the control module 32 has a dual control panel interface 37, so that a plurality of control modules can easily be cascaded. In this manner, also the respective operating modules are cascaded, while it is assumed that the operating modules are arranged one below the other for this purpose.

This may simplify the instructions to the user. One or more operating modules show the selectable signal sources, while one or more operating modules show the selectable signal drains and an operating module, for example, the bottommost operating module, can be reserved for entering control instructions only. By actuating a pushbutton assigned to a signal source and a pushbutton assigned to a signal drain directly after each other, the signal source and signal drain selected in this manner can be assigned to each other. The instructions to the operator are arranged such that the displays can be scrolled up and down line by line.

In a memory module 4 which is in the form of, for example, a commercially available personal computer with a hard drive, different configurations can be established and stored. When the pairs of modules are switched on, the processor of each pair of modules retrieves via instructions the most recently invoked configuration via the control panel 2 of the memory module 4. Other stored configurations may then be loaded by means of menu instructions. The connection between control panel 2 and personal computer is preferably a network connection.

The invention claimed is:

1. A modular control unit (3) for a control panel (2) for video apparatus, the control unit (3) including at least an operating module (31) and a control module (32), the control module (32) having a first interface (37) for connection to the control panel (2) and at least a second interface (35) for connection of the operating module (31), and the operating module (31) having at least an interface (34) for connection to the control module (32), the operating module (31) further including a parallel-in-serial-out shift register (SR) for receiving parallel data representing a status of the operating module (31) and serially outputting the data, the shift register being clocked by the control module (32) via the interface (34, 35).

2. The modular control unit (3) as claimed in claim 1, wherein the operating module (31) and control module (32) are arranged so that their respective interfaces (34, 35) can be directly connected.

3. The modular control unit (3) as claimed in claim 1, wherein the operating module (31) includes a demultiplexer (DEMUX) for driving display means associated with respective control components.

4. The modular control unit as claimed in claim 3, wherein an identification (ID) of the operating module (31) is applied in parallel form to the inputs of the shift register (SR) and serially output via the interface (34).

5. The modular control unit (3) as claimed in claim 1, wherein the control module (32) further comprises an interface (37) for driving a video apparatus (1), a processor (μP) and a memory (RAM, ROM) for generating control data, and a demultiplexer (DEMUX) for converting control component states which are present in serial form, as well as means for combining control data for display elements to a serial data stream.

6. A modular control unit (3) for a video apparatus comprising:
   an operating module (31) having at least one interface (34) and an identification code; and
   a control module (32) having a first interface (37) for connection to a control panel and at least a second interface (35) for connection to the at least one operating module interface (34), wherein said control module (32) identifies the type and structure of the operating module (31) using the identification code,
   wherein the operating module (31) further comprises:
      a parallel-in-serial-out shift register (SR) for serially outputting a status of the operating module (31) and the identification code, which shift register is clocked by the control module via the interface (34, 35).

7. The modular control unit (3) as claimed in claim 6, wherein the operating module (31) and control module (32) are arranged so that their interfaces (34, 35) can be directly connected.

8. The modular control unit (3) as claimed in claim 6, wherein the operating module (31) further comprises:
   a demultiplexer (DEMUX) for driving display means associated with the respective control components.

9. The modular control unit (3) as claimed in claim 6, wherein the control module (32) further comprises:
   an interface (37) for driving the video apparatus;
   a processor (μP);
   a memory (RAM, ROM) for generating control data;
   a demultiplexer (DEMUX) for converting control component states which are present in serial form; and
   a means for combining control data for display elements to a serial data stream.

10. A modular control unit (3) for a control panel (2) for video apparatus, the control unit (3) comprising at least an operating module (31) and a control module (32), the control module (32) comprising a first interface (37) for connection to the control panel (2) and at least a second interface (35) for connection of the operating module (31), and the operating module (31) comprising at least an interface (34) for connection to the control module (32), the operating module (31) further comprising a plurality of mechanical keys, each of said plurality of mechanical keys (33) having a corresponding liquid crystal display integrated with each key such that a function of each key can be juxtaposed and reassigned to another key.

* * * * *